United States Patent
Barsness et al.

(10) Patent No.: US 8,515,993 B2
(45) Date of Patent: Aug. 20, 2013

(54) METHODS AND APPARATUS FOR PROCESSING A DATABASE QUERY

(75) Inventors: Eric Lawrence Barsness, Pine Island, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/560,992

(22) Filed: Jul. 27, 2012

(65) Prior Publication Data

US 2012/0290618 A1  Nov. 15, 2012

Related U.S. Application Data

(63) Continuation of application No. 10/965,184, filed on Oct. 14, 2004, now abandoned.

(51) Int. Cl.
*G06F 17/30* (2006.01)

(52) U.S. Cl.
USPC .......................................................... 707/775

(58) Field of Classification Search
USPC .................. 707/775; 717/127, 718; 709/219
See application file for complete search history.

(56) References Cited

U.S. PATENT DOCUMENTS

| | | | |
|---|---|---|---|
| 5,511,190 A | 4/1996 | Sharma et al. | |
| 5,781,896 A | 7/1998 | Dalal | |
| 6,009,271 A * | 12/1999 | Whatley | 717/127 |
| 6,931,390 B1 | 8/2005 | Zait et al. | |
| 7,133,858 B1 | 11/2006 | Larson et al. | |
| 2002/0107835 A1 | 8/2002 | Coram et al. | |
| 2003/0093407 A1 | 5/2003 | Cochrane et al. | |
| 2004/0059757 A1 | 3/2004 | Hardman et al. | |
| 2004/0111410 A1 | 6/2004 | Burgoon et al. | |
| 2011/0313999 A1 * | 12/2011 | Bruno et al. | 707/718 |

* cited by examiner

*Primary Examiner* — Etienne Leroux
(74) *Attorney, Agent, or Firm* — Dugan & Dugan PC

(57) ABSTRACT

In a first aspect, a method is provided that includes the steps of (1) pre-computing a query result for each of a plurality of whole segments of data included in a database; (2) receiving a query specifying a defined range of data in the database; (3) determining if any of the whole segments are within the defined range; (4) performing the query on any partial segments of data within the defined range; and (5) determining the result of the query based on the pre-computed query results for any whole segments determined to be within the defined range and the result of the query on any partial segments within the defined range. Numerous other aspects are provided.

15 Claims, 4 Drawing Sheets

|   | A /202 | B /204 | C /206 | D /208 |
|---|--------|--------|--------|--------|
| 1 | Date | Revenue | Annual Total | Annual Average |
| 2 | Q1 2000 | 1000 — 210 | | |
| 3 | Q2 2000 | 1000 | | |
| 4 | Q3 2000 | 1000 | | |
| 5 | Q4 2000 | 1000 | 4000 | 1000 |
| 6 | Q1 2001 | 2000 | | |
| 7 | Q2 2001 | 2000 — 212 | | |
| 8 | Q3 2001 | 2000 | | |
| 9 | Q4 2001 | 2000 | 8000 | 2000 |
| 10 | Q1 2002 | 3000 | | |
| 11 | Q2 2002 | 3000 — 214 | | |
| 12 | Q3 2002 | 3000 | | |
| 13 | Q4 2002 | 3000 | 12000 | 3000 |
| 14 | Q1 2003 | 4000 | | |
| 15 | Q2 2003 | 4000 — 216 | | |
| 16 | Q3 2003 | 4000 | | |
| 17 | Q4 2003 | 4000 | 16000 | 4000 |
| 18 | Q1 2004 | 5000 | | |
| 19 | Q2 2004 | 5000 | | |
| 20 | Q3 2004 | 5000 | | |

FIG. 2

METHODS AND APPARATUS FOR PROCESSING A DATABASE QUERY

CROSS REFERENCE TO RELATED APPLICATION

This is a continuation of U.S. patent application Ser. No. 10/965,184, filed Oct. 14, 2004, which is hereby incorporated by reference herein in its entirety.

FIELD OF THE INVENTION

The present invention relates generally to computer systems, and more particularly to methods and apparatus for processing a database query.

BACKGROUND

A database frequently receives a query for information, such as a sum, average, or the like, from a range of data in a database. Conventionally, in response to such query, the database accesses every record, each of which includes one or more data entries, in the range of data to process the query. However, such a method for processing a database query results in large processing overhead.

Accordingly, methods and apparatus for improved processing of a database query are desired.

SUMMARY OF THE INVENTION

In a first aspect of the invention, a first method is provided. The first method includes the steps of (1) pre-computing a query result for each of a plurality of whole segments of data included in a database; (2) receiving a query specifying a defined range of data in the database; (3) determining if any of the whole segments are within the defined range; (4) performing the query on any partial segments of data within the defined range; and (5) determining the result of the query based on the pre-computed query results for any whole segments determined to be within the defined range and the result of the query on any partial segments within the defined range.

In a second aspect of the invention, a method of processing a database query for information is provided. The method includes the steps of (1) receiving a request to perform a query on a first portion of data in a database; (2) determining the result of the query on the first portion of the database is based on at least one pre-computed result, wherein the pre-computed result is a result of the query on a second portion of data in the database that is included in the first portion; (3) performing the query on a third portion of data in the database, wherein the third portion is a portion of the first portion other than the second portion; and (4) computing the result of the query on the first portion based on the pre-computed result and the result of the query on the third portion. Numerous other aspects are provided, as are methods, systems, apparatus and computer program products in accordance with these other aspects of the invention. Each computer program product described herein may be carried by a medium readable by a computer (e.g., a carrier wave signal, a floppy disc, a compact disc, a DVD, a hard drive, a random access memory, etc.).

Other features and aspects of the present invention will become more fully apparent from the following detailed description, the appended claims and the accompanying drawings.

BRIEF DESCRIPTION OF THE FIGURES

FIG. 2 is a block diagram of an example of a database that may be used in an apparatus for processing a database query in accordance with an embodiment of the present invention.

DETAILED DESCRIPTION

The present invention provides methods and apparatus for efficiently processing a database query. More specifically, the present methods and apparatus avoid having to access a large portion of a range (e.g., the entire range) specified by the database query. Consequently, the present methods and apparatus provide performance gains for processing database queries compared to conventional database query processing.

Figure 1:
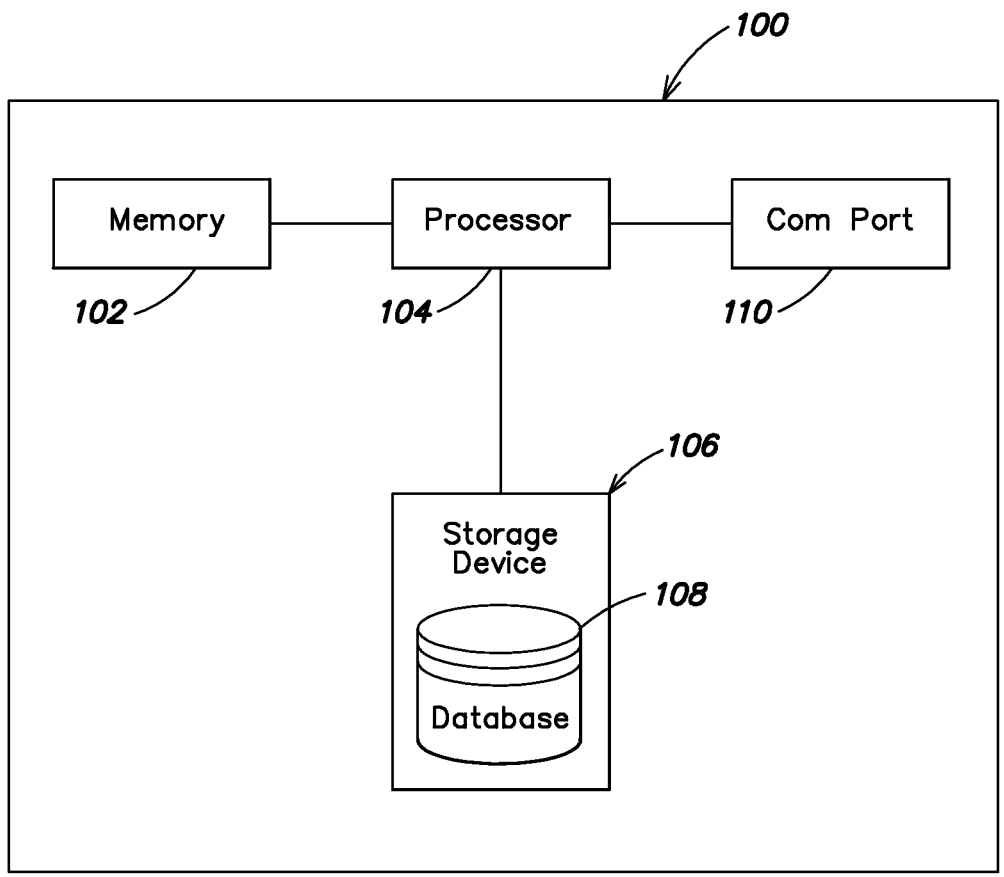
FIG. 1 is block diagram of an apparatus for processing a database query in accordance with an embodiment of the present invention.

FIG. 1 is block diagram of an apparatus for processing a database query in accordance with an embodiment of the present invention. With reference to FIG. 1, the apparatus 100 for processing a database query includes a memory 102 for storing data coupled to a processor 104. The processor 104 is coupled to a storage device 106, such as a disk drive or the like, which includes a database 108. Details of the database 108 are described below with reference to FIG. 2. The processor 104 is adapted to execute code, which is adapted to efficiently query the database 108. More specifically, the processor 104 is adapted to execute code adapted to perform a first and/or second exemplary method in accordance with an embodiment of the present invention. Details of the first and second exemplary methods are described below with reference to FIGS. 3 and 4, respectively. Additionally, the apparatus 100 may include a communication (e.g., com) port 110 for communicating with other apparatus.

FIG. 2 is a block diagram of an example of a database that may be used in an apparatus for processing a database query in accordance with an embodiment of the present invention. With reference to FIG. 2, the database 108 may store data relevant to, for example, a specific customer or application. Such data may be organized in a manner specified by a user, such as a database administrator. For example, the database 108 may include a first column 202 of data representing dates. More specifically, the first column 202 includes a data entry (e.g., in a row corresponding to the column) for each quarter from the first quarter of year 2000 to the third quarter of year 2004. The database 108 includes a second column 204 of data representing revenue. For example, the second column 204 of data includes a data entry, corresponding to each quarter in the first column 202, representing revenue.

Further, the database 108 includes data based on (e.g., computed from) other data in the database 108. More specifically, the database 108 may include a third column 206 of data, each entry of which represents total revenue for a year (e.g., a sum of the revenue data for each quarter of the year). Similarly, the database 108 may include a fourth column 208 of data, each entry of which represents average quarterly revenue for a year (e.g., an average of the revenue data for the quarters of the year). For example, each data entry in the third 206 and/or fourth column 208 is based on data entries in the second column 204 that correspond to quarters of a particular year from the first column 202. As described further below, data in the database 108 may be grouped together to form one or more (e.g., a plurality) of whole segments 210-216. Although data in the database 108 of FIG. 2 includes four whole segments 210-216, data in the database 108 may include a larger or smaller number of whole segments. Further, a whole segment may include a larger or smaller amount of data than the whole segments 210-216 illustrated in FIG. 2.

The structure of the database 108 (e.g., arrangement of data in rows and columns) described above is exemplary. The database 108 may be structured in a different manner. For example, the database 108 may be a relational database, flat-file database, object database, distributed database, or the like. Further, the description of data populating the database 108 is exemplary. The database 108 may include different data.

Figure 3:
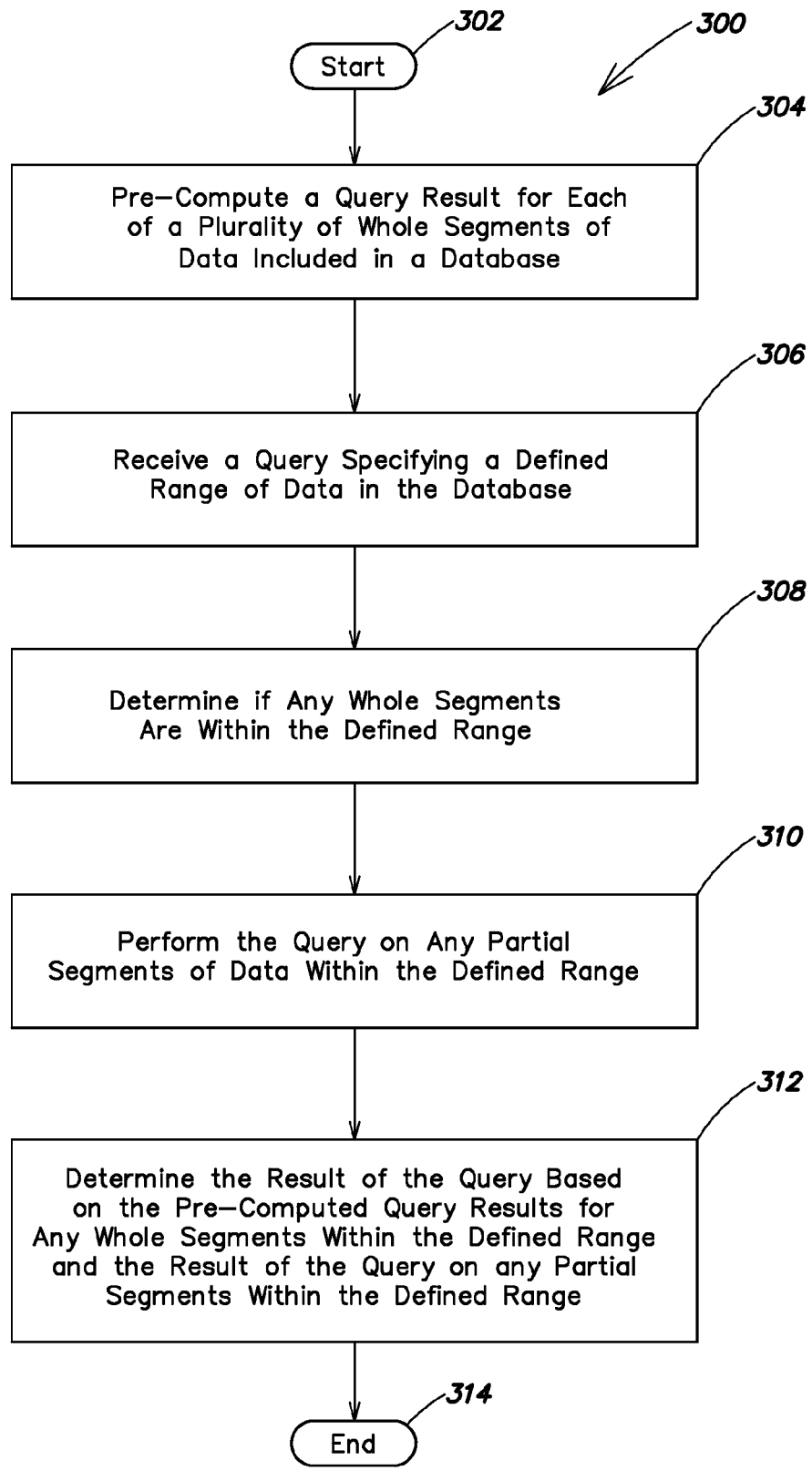
FIG. 3 is a first exemplary method for processing a database query in accordance with an embodiment of the present invention.

The operation of the apparatus 100 for processing a database query is now described with reference to FIG. 2 and with reference to FIG. 3, which illustrates a first exemplary method 300 for processing a database query in accordance with an embodiment of the present invention. With reference to FIG. 3, in step 302, the method 300 begins. In step 304, a query result for each of a plurality of whole segments of data included in a database is pre-computed. As stated, the database 108 may be grouped into one or more (e.g., a plurality of) whole segments. For example, data entries of the second column 204 of the database 108 that correspond to quarters from a particular year (e.g., 2000, 2001, 2002 or 2003) of the first column 202 may be grouped into respective whole segments 210-216 (shown in phantom). Therefore, the example database 108 includes four whole segments. A query for information, such as a sum, average, or the like, from the database (e.g., from a range of data in the database) are frequently received. Conventionally, in response to such query, the database accesses every record, which includes one or more entries, in the range of data to process the query. However, in step 304, a query for information, such as a sum, average, or the like, is performed on each whole segment 210-216 in the database 108 (e.g., in advance of computing a result for the query for information from the range of data). In this manner, the result of the query on each of the plurality of whole segments 210-216 is computed before receiving and/or computing the result of a query for information from a range of data in the database (e.g., pre-computed). Such result may be stored as an entry in the database 108 (e.g., in the third 206 or fourth column 208 of the database 108). While this example shows additional columns explicitly added to the database table for use in storing pre-computed values, a hybrid index could be used instead. The hybrid index would store the pre-computed values as metadata, and queries using the index would retrieve the metadata for whole segments from the index rather than directly from the table.

For example, the sum of data in each whole segment 210-216, which represents total revenue for years 2000, 2001, 2002 and 2003, respectively, is computed. Additionally or alternatively, the average of data in each whole segment 210-216, which represents average quarterly revenue for years 2000, 2001, 2002 and 2003, respectively, is computed. Although, the third column 206 of the database 108 stores annual data and the fourth column 208 of average quarterly data, the hybrid index may be configured to store data representing other periods of time (e.g., daily, monthly, etc.).

In step 306, a query specifying a defined range of data in the database is received. More specifically, as stated above, a query for information such as a sum, average, or the like, from a range of data in the database may be received by the database. For example, the database may be queried for total revenue from the third quarter of year 2000 to the second quarter of year 2003.

In step 308, it is determined if any whole segments are within the defined range. For example, the apparatus 100 determines that two whole segments 212-214 are within the predefined range. Because the result of such query for each whole segment 210-216 in the database 108 is pre-computed, by determining whether any whole segments 210-216 are within the defined range, the apparatus 100 may avoid having to access every record in the defined range to process the query. More specifically, the apparatus 100 may not need to access every record corresponding to such whole segments 212-214 (e.g., in response to the query) to process the query.

In step 310, the query is performed on any partial segments of data within the defined range. More specifically, the apparatus 100 may determine the defined range includes one or more partial segments (e.g., parts of a whole segment) of data. In the example above, the apparatus 100 determines the defined range includes a part (e.g., revenue for the last two quarters of year 2000) of the whole segment 210 that represents revenue for year 2000 and includes a part (e.g., revenue for the first two quarters of year 2003) of the whole segment 216 that represents the revenue for year 2003. The apparatus 100 performs the query on a range defined by each such partial segment. For example, the apparatus 100 may determine total revenue for the third and fourth quarter of year 2000 by accessing the entries in such range. Similarly, the apparatus 100 may determine total revenue for the first and second quarter of year 2003 by accessing the entries in such range. In this manner, the result of the query on any partial segments of data within the defined range is determined.

In step 312, the result of the query specifying the defined range is determined based on the pre-computed query results for any whole segments determined to be within the defined range and the result of the queries on any partial segments within the defined range. More specifically, the pre-computed query result for each whole section 212-214 determined to be within the defined range is accessed. For example, entries in the third column 206 corresponding to the total revenue for year 2001 (e.g., "8000") and 2002 (e.g., "12000") are accessed. Such entries are added to the result of the query on the partial segments to produce the result of the query specifying the defined range. In embodiments which employ a hybrid index, a pre-computed query result in the hybrid index is accessed. Thereafter, step 314 is performed. In step 314, the method 300 ends.

Figure 4:
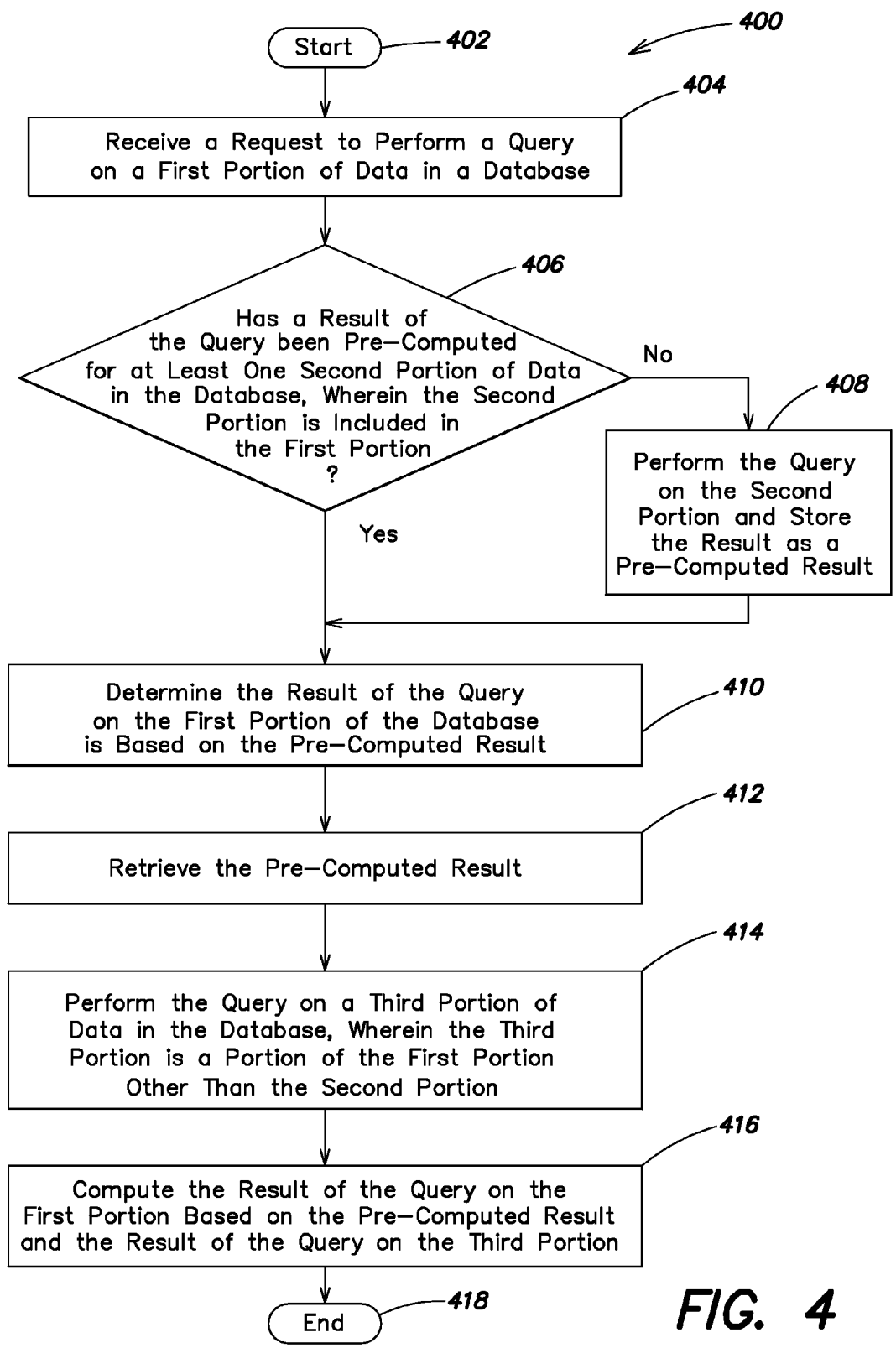
FIG. 4 is a second exemplary method for processing a database query in accordance with an embodiment of the present invention.

The operation of the apparatus 100 for processing a database query is now described with reference to FIG. 2 and with reference to FIG. 4, which illustrates a second exemplary method 400 for processing a database query in accordance with an embodiment of the present invention. With reference to FIG. 4, in step 402, the method 400 begins. In step 404, a request to perform a query on a first portion of data in a database is received. More specifically, the apparatus 100 may query a defined range of the database 108 for information. The defined range serves as the first portion. For example, the apparatus 100 may query the database for total revenue from the third quarter of year 2000 to the second quarter of year 2003, in which case revenue entries from the third quarter of year 2000 to the second quarter of year 2003 are included in the first portion.

In step 406, it is determined whether a result of the query has been pre-computed for at least one second portion of data in the database, wherein the second portion is included in the first portion. A second portion may be, for example, quarterly revenue data for year 2001 and/or quarterly revenue data for year 2002, which is entirely included in first portion of data. The second portion may have a pre-computed result associated with it. Therefore, in step 406, the apparatus 100 may determine whether a total revenue for year 2001 (e.g., a sum of the quarterly revenues for year 2001) and/or quarterly revenue data for year 2002 has been pre-computed. If it is determined in step 406 that a result of the query has not been pre-computed for at least one second portion of data in the database, step 408 is performed. Alternatively, if it is determined a result of the query has been pre-computed for at least one second portion of data in the database, step 410 is performed.

In step 408, the query is performed on the second portion and the result of such query is stored as a pre-computed result. For example, similar to step 304 of method 300, the apparatus may query a second portion of data, which is entirely included in first portion of data, for information before arriving at the result of the query on the first portion of data. For example, the apparatus 100 may pre-compute total revenue for year 2001 by querying the database for total revenue from the first quarter of year 2001 to the fourth quarter of year 2001, in which case revenue entries from the first quarter of year 2001 to the fourth quarter of year 2001 are included in the second portion, and store the result of the query as a pre-computed result in a third column 206 of the database 108. Similarly, the apparatus 100 may pre-compute total revenue for year 2002 by querying the database for total revenue from the first quarter of year 2002 to the fourth quarter of year 2002, in which case revenue entries from the first quarter of year 2002 to the fourth quarter of year 2002 are included in the second portion, and store the result of the query as pre-computed result in the third column 206 of the database 108. In this manner, a query is performed on the second portion of data and the result of such query is stored as needed (e.g., only in response to a request to perform a query on the first portion of data), thereby avoiding unnecessary processing. Thereafter, step 410 is performed.

In step 410, it is determined that the result of the query on the first portion of the database is based on at least one pre-computed result. Upon receiving a request to perform the query on the first portion of data in the database, the apparatus 100 may determine that pre-computed results may be employed to determine the query result.

In step 412, the pre-computed result is retrieved. For example, the apparatus may access the third column 206 of the database 108 and retrieve the value of the total revenue for year 2001 and/or year 2002.

In step 414, the query is performed on a third portion of data in the database, wherein the third portion is a portion of the first data other than the second portion. For example, the apparatus 100 may query the database for total revenue for the third and fourth quarters of year 2000 and the first and second quarters of year 2003, in which case revenue entries from the third and fourth quarters of year 2000 and the first and second quarters of year 2003 are included in the third portion.

In step 416, the result of the query on the first portion is computed based on the at least one pre-computed result and the result of the query on the third portion of data. For example, the at least one pre-computed result is added to the result of the query on the third portion of data to yield the result of the query on the first portion of data in the database. Thereafter, step 418 is performed. In step 418, the method 400 ends.

Through use of the method 300 or method 400, a result of a query, which specifies a defined range of data in a database, may be determined without accessing every record corresponding to the defined range in response to the query. In this manner, the method 300 and method 400 may efficiently query a database, thereby providing performance gains over conventional database queries.

The foregoing description discloses only exemplary embodiments of the invention. Modifications of the above disclosed apparatus and methods which fall within the scope of the invention will be readily apparent to those of ordinary skill in the art. For instance, although in one or more embodiments above, data in the database was grouped into segments or portions by date, the data in the database may be grouped into segments or portions based on another parameter associated with the data. Further, in one or more embodiments, data in the whole segments or second portion, and therefore, results based on such data, which is stored in a hybrid index, may be monitored to determine how frequently such data is accessed. Data used infrequently may be discarded. In some embodiments, an algorithm may be used to determine how frequently such data is determined. Based upon the monitoring, the apparatus may determine whether to continue storing the results based upon such data. In this manner, unused data may not unnecessarily occupy database space. Further, a threshold age may be employed such that only pre-computed results performed on a recent date range of data (e.g., defined by the threshold age, such as data stored within the last year, month, week, etc.) are stored. For example, if the database includes a long history of data but only data within a recent date range is accessed, according to the present methods and apparatus, only pre-computed results performed on such date range are stored, thereby saving database space. Pre-computed results performed on older date ranges may be removed.

Accordingly, while the present invention has been disclosed in connection with exemplary embodiments thereof, it should be understood that other embodiments may fall within the spirit and scope of the invention, as defined by the following claims.

The invention claimed is:

1. A method comprising:
   pre-computing a first query result based on a first segment of data stored in a database in response to receiving a first query;
   storing the first query result in the database;
   receiving a second query specifying a second segment of data stored in the database;
   determining whether the first segment of data is included in the second segment of data;
   performing the second query on one or more third segments of data included in the second segment of data, wherein the one or more third segments of data do not include data from the first segment of data; and
   computing a second query result based on a result of the performing the second query on the one or more third segments of data and, in response to determining that the first segment of data is included in the second segment of data, the first query result.

2. The method of claim 1 wherein the computing a second query result comprises retrieving the first query result from the database in response to determining that the first segment of data is included in the second segment of data.

3. The method of claim 1 wherein the computing a second query result comprises numerically adding together or numerically averaging the first query result and the result of the performing the second query on the one or more third segments of data.

4. The method of claim 1 further comprising computing a second query result based only on a result of the performing the second query on the one or more third segments of data in response to determining that the first segment of data is not included in the second segment of data.

5. The method of claim 1 wherein the first segment of data, the second segment of data, and the one or more third segments of data are each based on a date range.

6. The method of claim 1 wherein the second segment of data consists of the first segment of data and the one or more third segments of data, wherein the first segment of data and the one or more third segments of data are non-overlapping subsets of the second segment of data.

7. A method of processing a database query for information, comprising:
receiving a request to perform a query on a first portion of data stored in a database in a storage device to determine a query result;
determining whether a pre-computed partial result of the query is stored in the database, wherein the pre-computed partial result is a result of the query performed on a second portion of data stored in the database, and the second portion of data is included in the first portion of data;
retrieving the pre-computed partial result from the database in response to determining that the pre-computed partial result is stored in the database;
performing the query on the second portion of data to determine a second partial result in response to determining that the pre-computed partial result is not stored in the database;
performing the query on a third portion of data in the database to determine a third partial result, wherein the third portion of data is included in the first portion of data and not included in the second portion of data; and
determining the query result based on the third partial result and the pre-computed partial result or the second partial result.

8. The method of claim 7 wherein the determining the query result comprises numerically adding together or numerically averaging the third partial result and the pre-computed partial result or the second partial result.

9. The method of claim 7 wherein:
the first portion of data is based on a first range of dates, the second portion of data is based on a second range of dates, and the third portion of data is based on a third range of dates; and
the first range of dates includes the second and third ranges of dates.

10. An apparatus comprising:
a database in a storage device for storing data;
a processor coupled to the storage device and programmed to:
pre-compute a first query result based on a first segment of data stored in the database in response to receiving a first query;
store the first query result in the database;
receive a second query specifying a second segment of data stored in the database;
determine whether the first segment of data is included in the second segment of data;
perform the second query on one or more third segments of data included in the second segment of data, wherein the one or more third segments of data do not include data from the first segment of data; and
compute a second query result based on a result of the performing the second query on the one or more third segments of data and, in response to determining that the first segment of data is included in the second segment of data, the first query result.

11. The apparatus of claim 10 wherein the processor is further programmed to compute a second query result by retrieving the first query result from the database in response to determining that the first segment of data is included in the second segment of data.

12. The apparatus of claim 10 wherein the processor is further programmed to compute a second query result by numerically adding together or numerically averaging the first query result and the result of the performing the second query on the one or more third segments of data.

13. The apparatus of claim 10 wherein the processor is further programmed to compute a second query result based only on a result of the performing the second query on the one or more third segments of data in response to determining that the first segment of data is not included in the second segment of data.

14. The apparatus of claim 10 wherein the first segment of data, the second segment of data, and the one or more third segments of data are each based on a date range.

15. The apparatus of claim 10 wherein the second segment of data consists of the first segment of data and the one or more third segments of data, wherein the first segment of data and the one or more third segments of data are non-overlapping subsets of the second segment of data.

* * * * *